United States Patent [19]

Matthies et al.

[11] 4,206,256

[45] Jun. 3, 1980

[54] METALLIZED VIDEO DISC HAVING AN INSULATING LAYER THEREON

[75] Inventors: Dennis L. Matthies, Princeton; Robert M. Mehalso, Trenton; Grzegorz Kaganowicz, Princeton, all of N.J.

[73] Assignee: RCA Corporation, New York, N.Y.

[21] Appl. No.: 606,655

[22] Filed: Aug. 21, 1975

[51] Int. Cl.$^2$ .......................... B32B 3/02; G11B 5/82
[52] U.S. Cl. ............................. 428/64; 179/100.1 B; 358/128.5; 428/65; 428/447; 428/450
[58] Field of Search ................ 428/64, 65, 447, 450; 178/6.6 DD; 358/6, 128; 252/28; 179/100.1 B

[56] References Cited

U.S. PATENT DOCUMENTS

| | | | |
|---|---|---|---|
| 3,833,408 | 9/1974 | Matthies | 252/49.6 |
| 3,843,399 | 10/1974 | Kaplan et al. | 358/128 |
| 3,882,214 | 5/1975 | Nosker et al. | 179/100.1 B |
| 3,901,994 | 8/1975 | Mehalso et al. | 179/100.1 B |
| 3,982,066 | 9/1976 | Nyman et al. | 358/128 |
| 4,004,080 | 1/1977 | Vossen, Jr. et al. | 358/128 |
| 4,018,945 | 4/1977 | Melhaso | 358/128 |
| 4,072,985 | 2/1978 | Kaganowicz et al. | 358/128 |
| 4,077,051 | 2/1978 | Vossen, Jr. | 358/128 |
| 4,077,052 | 2/1978 | Vossen, Jr. | 358/128 |

*Primary Examiner*—William R. Dixon, Jr.
*Attorney, Agent, or Firm*—Birgit E. Morris

[57] ABSTRACT

Methyl alkyl siloxanes can be employed as the dielectric coating on metallized video disc replicas when the metal surface on the disc has a high surface energy.

6 Claims, No Drawings

METALLIZED VIDEO DISC HAVING AN INSULATING LAYER THEREON

This invention relates to improved information records employing capacitance variation effects to permit playback of video recordings. More particularly, this invention relates to replicas of such recordings and an improved method of making them.

BACKGROUND OF THE INVENTION

A video information system for recording and playback of video information has been described by Clemens in U.S. Pat. Nos. 3,842,194 and 3,842,217. According to this system, video, audio and color information is recorded in the form of geometric variations in the bottom of a spiral groove in a surface of a disc. Disc replicas made of an insulating material, such as vinyl, are coated with a conductive metal layer as a first electrode of a capacitor and then with a dielectric film. A metal tipped stylus acts as a second electrode of the capacitor. The stylus monitors changes in capacitance between the stylus and the metal film on the record as these geometric variations pass beneath the stylus upon rotation of the grooved disc to effect recovery of signals occupying a band width of at least several megahertz and converted back to video information suitable for display by a television monitor.

In this system, the metal stylus is separated from the conductive disc surface by a thin dielectric layer. In order to produce good quality recordings, this dielectric layer must be uniform in depth and composition, thin enough so that the minute dimensional variations in the groove can be detected in an exact manner, yet without pinholes which would cause shorts due to metal-to-metal contact during playback. In addition, the dielectric coating must be strong enough to withstand repeated passes of the stylus without damage to or undue wear of the stylus, the disc coating or the metallized disc surface beneath. Thus the dielectric coating must have lubricant properties as well as high strength. The dielectric surface must also be resistant to degradation due to light or oxidation and must be inert with respect to the material from which the disc is made and to the metal coating. Still further, the dielectric layer must be able to be applied in a rapid and simple manner, suitable for mass production techniques.

U.S. Pat. No. 3,843,399 describes a dielectric polymeric coating applied by a glow discharge technique. This coating, while it can be applied as a uniform, pinhole-free, conformal film, does not have the lubricant properties required and the stylus wear rate is extremely high. The polymeric dielectric layer thus must be coated with a lubricant film. A suitable lubricant film has been described in U.S. Pat. No. 3,833,408 for example. These lubricants are methyl alkyl siloxanes which have the formula

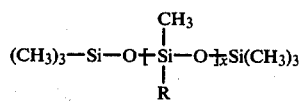

wherein R is an alkyl group, preferably from 4 to 20 carbon atoms and x is an integer.

It would be desirable, in the interest of cost reduction for making these disc recordings, to be able to apply a single dielectric layer which would have all of the properties required.

SUMMARY OF THE INVENTION

We have discovered that methyl alkyl siloxane coatings can be applied directly to the conductive metal layer of a video disc to form excellent, long wearing dielectric coatings. When a highly inert metal, such as gold, is used as the metal coating, no pretreatment of the metal layer is required and the methyl alkyl siloxane can be applied directly. When a metal having a lower surface energy, such as nickel or copper is employed, the metal layer should be pretreated to increase its surface energy before applying the methyl alkyl siloxane layer.

DETAILED DESCRIPTION OF THE INVENTION

The methyl alkyl siloxane materials useful as the dielectric layer herein have the formula

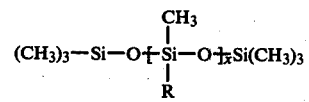

wherein R is an alkyl group of 4 to 20 carbon atoms and x is an integer. These methyl alkyl siloxanes vary from liquids to waxes, depending on their molecular weight, i.e., the number of carbon atoms in the alkyl chain and the value of x.

The above methyl alkyl siloxanes have a combination of properties which render them uniquely suitable for the present application. They have good dielectric properties, good lubricant properties and can be applied in a uniform, conformal layer which, although liquid, resists the extremely high pressure of the contacting stylus so as to prevent contact between the metal stylus and the conductive metal layer on a video disc. Although the exact reason for this behavior is unknown, it is believed the combination of long backbone chains and bulky side chains of the siloxanes become entangled, forming a mesh which prevents the stylus from penetrating the layer to contact the conductive metal layer beneath.

A siloxane compound as described above is applied to the metal surface of a conductive video disc replica from solution in a suitable solvent, such as isopropanol or heptane. The solution is applied in any conventional manner, as by brushing, spraying, spinning, dipping and the like. Preferably this solution is applied by spinning, e.g., directing a small stream initially from the center of the disc and moving radially across the disc to the outer circumference while rotating the disc so as to distribute the solution evenly to the entire surface and to cause any excess solution to be drawn off. The solvent is then removed, as by evaporation. Alternatively, the siloxane compound can be applied without a solvent or by evaporation coating or other suitable means.

The above described methyl alkyl siloxane compounds provide excellent coatings for metals having smooth surfaces, and having high surface energies, such as gold. For metal surfaces which have lower surface energies, such as nickel, copper and the like, the adhesion and uniformity of the dielectric layer and record wear of the resultant video disc replicas are improved markedly by treating the metal layer so as to impart increased surface energy to its surface prior to applying the methyl alkyl siloxane layer. This can be done for example by exposing the metallized disc to a source of energy, as to a glow discharge, corona discharge and the like. The amount of surface energy required is that necessary to obtain a contact angle of water on the surface of about 30° or less. Thus the surface energy can be monitored simply by measuring the contact angle of water on the surface.

The invention will be further described by the following examples but the invention is not meant to be limited to the details described therein. In the examples, parts and percentages are by weight.

EXAMPLE 1

Several 12 inch (30 cm) vinyl video disc replicas were prepared according to the method of Clemens disclosed in U.S. Pat. No. 3,842,194 from a single stamper. A thin gold coating of varying thicknesses was evaporated onto the discs. While rotating at a speed of 1000 rpm, a solution containing one part of a lubricant, SF 1147, commercially available from the General Electric Company, which has a room temperature viscosity of 50 centistokes and the formula given below:

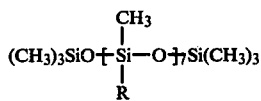

wherein R is an alkyl group of 10 carbon atoms, and 99 parts of isopropanol was sprayed onto the discs and dried to remove the solvent.

The discs were played back using a stylus having a force of 0.16 grams. Picture quality was evaluated by counting dropouts. They were compared to a control disc replica, also from the same stamper, having a gold metal layer and a layer of a polymer of styrene 450 angstroms thick thereover, applied by the method of U.S. Pat. No. 3,843,399 and sprayed with the siloxane as above. The data are summarized below:

| Sample Disc | Gold Thickness Angstroms | No. of Plays | Dropouts, count/sec. |
|---|---|---|---|
| Control | 500 | 1 | 5.8 |
| 1 | 50 | 1 | 5.1 |
| 2 | 50 | 2 | 5.3 |
| 3 | 500 | 1 | 3.5 |
| 4 | 500 | 2 | 3.7 |

EXAMPLE 2

A vinyl video disc replica as in Example 1 having a gold coating 500 angstroms thick was spray coated with a 1% solution in isopropanol of an SF 1147 having a room temperature viscosity of 1400 centistokes. This methyl alkyl siloxane has the formula

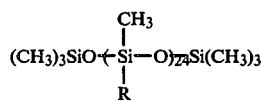

wherein R is decyl. The disc replica was played back over 1000 times without noticable wear or degradation of the disc replica.

EXAMPLE 3

Vinyl video disc replicas as in Example 1 were coated with a layer of nickel by immersing in an electroless plating bath containing 18 grams per liter of nickel sulfamate, 36 grams per liter of sodium pyrophosphate and 1 gram per liter of dimethylamineborane. The pH of the bath was adjusted to 10–10.5. Plating time varied from about 0.5 to 3 minutes to give a nickel coating about 500 angstroms thick.

The methyl alkyl siloxane SF 1147–50 centistokes was applied to one of the discs as in Example 1. After about 50 plays, the disc showed extreme wear.

Another of the discs was exposed to a glow discharge in a suitable vacuum chamber wherein the pressure was reduced to 500 torr of air. The frequency was 200 Khz, current 78 microamperes, voltage 220 volts. The glow was maintained for 60 seconds. SF 1147–1400 centistokes siloxane was applied as above. No deterioration was noted after 300 plays.

We claim:
1. A capacitive video frequency recording means having a spiral groove on a face thereof and video information in the form of geometric variations in said groove, said recording means having a thin conductive layer having a high surface energy on said face and a thin dielectric layer of uniform thickness on said conductive layer, said dielectric layer consisting essentially of a liquid methyl alkyl siloxane of the formula

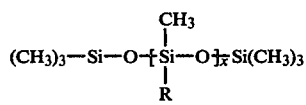

wherein R is an alkyl group and x is an integer.

2. An information record adapted for use with a playback stylus to effect recovery of a signal occupying a band width of at least several megahertz upon rotation of said record, said record comprising
   (a) a disc having a spiral groove in a surface thereof, said groove being dimensioned for reception therein of said stylus and containing an information track constituted by geometric variations in said groove,
   (b) a continuous conductive metal layer on said surface, said layer being of substantially uniform thickness which does not fill said groove and which has a high surface energy,
   (c) a dielectric coating of uniform thickness overlying said metal layer, said dielectric being a liquid methyl alkyl siloxane of the formula

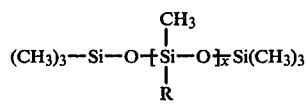

wherein R is an alkyl group and x is an integer.

3. A record according to claim 2 wherein said conductive metal layer is gold.

4. A record according to claim 2 wherein said conductive metal layer is nickel having sufficient surface energy such that the contact angle of water on its surface is below about 30°.

5. A record according to claim 2 wherein
   R is an alkyl group of 4 to 20 carbon atoms and x is an integer from 7 to 24.

6. A record according to claim 4 wherein the methyl alkyl siloxane has a room temperature viscosity of about 1400 centistokes and wherein R is decyl.

* * * * *